US008214077B2

(12) United States Patent
Bertrand et al.

(10) Patent No.: US 8,214,077 B2
(45) Date of Patent: Jul. 3, 2012

(54) MEDICATION DISPENSING SYSTEM AND METHOD

(75) Inventors: Jocelyn Bertrand, Québec (CA); Denis Faucher, Québec (CA); Etienne-Vincent Hardy, Québec (CA); Camille Lapierre, Québec (CA); Sylvain Piché, Saint-Lambert-de-Lauzon (CA); Christian Rouleau, Québec (CA); Christian Vailles, Québec (CA)

(73) Assignee: Groupe Domedic Inc., Quebec (CA)

( * ) Notice: Subject to any disclaimer, the term of this patent is extended or adjusted under 35 U.S.C. 154(b) by 309 days.

(21) Appl. No.: 12/448,327

(22) PCT Filed: Jan. 21, 2008

(86) PCT No.: PCT/CA2008/000107

§ 371 (c)(1), (2), (4) Date: Jun. 17, 2009

(87) PCT Pub. No.: WO2008/086628

PCT Pub. Date: Jul. 24, 2008

(65) Prior Publication Data

US 2010/0049361 A1 Feb. 25, 2010

(30) Foreign Application Priority Data

Jan. 19, 2007 (CA) ...................................... 2575125

(51) Int. Cl.
*G06F 17/00* (2006.01)
*B65H 1/00* (2006.01)

(52) U.S. Cl. ........ 700/236; 700/244; 700/242; 700/232; 221/2; 221/92

(58) Field of Classification Search .................. 700/236, 700/231, 232, 242, 244; 221/2, 92
See application file for complete search history.

(56) References Cited

U.S. PATENT DOCUMENTS

| | | | | | |
|---|---|---|---|---|---|
| 262,190 | A | | 12/1981 | Stanton | D9/415 |
| 4,526,474 | A | * | 7/1985 | Simon | 368/10 |
| 4,617,557 | A | * | 10/1986 | Gordon | 340/309.7 |
| 4,640,560 | A | | 2/1987 | Blum | 312/234.1 |
| 4,682,299 | A | | 7/1987 | McIntosh et al. | 364/569 |
| 4,695,954 | A | | 9/1987 | Rose et al. | 364/413 |
| 4,717,042 | A | * | 1/1988 | McLaughlin | 221/3 |
| 296,589 | A | | 7/1988 | Webster | D24/31 |
| 4,768,177 | A | | 8/1988 | Kehr et al. | 368/10 |

(Continued)

FOREIGN PATENT DOCUMENTS

GB 2 344 194 5/2000

(Continued)

*Primary Examiner* — Michael K Collins
(74) *Attorney, Agent, or Firm* — McNeely Hare & War; Christopher Casieri

(57) ABSTRACT

A medication dispensing system and method where the patient can have his personal console capable of receiving an insert having a tray with an array of medication compartments corresponding to respective times and dates at which the medication is prescribed to be taken. A database in the console can be set with the specified times and dates at which the medication is to be taken. When the console determines the time to dispense medication in one of the compartments has been reached, a visual and/or audible indicator can be triggered. Membranes which are to be hand-removed by the patient cover the respective compartments. A detector provided under the insert can detect across the tray whether or not the membrane corresponding to the selected medication compartment has been removed.

4 Claims, 8 Drawing Sheets

U.S. PATENT DOCUMENTS

| | | | | |
|---|---|---|---|---|
| 5,014,851 | A | 5/1991 | Wick | 206/539 |
| 5,020,037 | A | 5/1991 | Raven | 368/10 |
| 5,050,739 | A | 9/1991 | Hannan et al. | 206/531 |
| 5,072,430 | A * | 12/1991 | Eckernas et al. | 368/10 |
| 5,181,189 | A * | 1/1993 | Hafner | 368/10 |
| 5,200,891 | A | 4/1993 | Kehr et al. | 364/413.01 |
| 5,408,443 | A | 4/1995 | Weinberger | 368/10 |
| 5,412,372 | A * | 5/1995 | Parkhurst et al. | 340/568.1 |
| 5,445,294 | A | 8/1995 | Gardner et al. | 221/1 |
| 391,156 | A | 2/1998 | Stevens | D9/345 |
| 5,745,366 | A * | 4/1998 | Higham et al. | 700/242 |
| 5,836,474 | A | 11/1998 | Wessberg | 221/25 |
| 5,954,225 | A | 9/1999 | Powe | 221/2 |
| 6,151,536 | A | 11/2000 | Arnold et al. | 700/237 |
| 6,169,707 | B1 * | 1/2001 | Newland | 368/10 |
| 6,294,999 | B1 | 9/2001 | Yarin et al. | 340/573.1 |
| 6,411,567 | B1 * | 6/2002 | Niemiec et al. | 368/10 |
| 6,449,218 | B1 | 9/2002 | Lluch | 368/10 |
| 6,625,518 | B2 * | 9/2003 | Depeursinge | 700/242 |
| 6,640,159 | B2 * | 10/2003 | Holmes et al. | 700/244 |
| 6,644,496 | B1 * | 11/2003 | Ambrosio | 221/2 |
| 6,760,643 | B2 | 7/2004 | Lipps | 700/231 |
| 6,801,123 | B2 | 10/2004 | Brakus | 340/309.16 |
| 6,805,259 | B2 | 10/2004 | Stevens et al. | 221/124 |
| 7,170,823 | B2 | 1/2007 | Fabricius et al. | 368/10 |
| 7,213,822 | B1 | 5/2007 | Webster | 280/79.3 |
| 7,300,006 | B2 | 11/2007 | Weisbeck | 241/63 |
| 7,344,047 | B2 * | 3/2008 | Gilmore | 221/2 |
| 7,369,919 | B2 * | 5/2008 | Vonk et al. | 700/236 |
| 7,451,876 | B2 * | 11/2008 | Bossi et al. | 206/534 |
| 7,458,484 | B2 | 12/2008 | Stevens | 221/30 |
| 7,481,331 | B2 | 1/2009 | Webster et al. | 221/307 |
| 7,726,485 | B2 * | 6/2010 | Brollier | 206/534 |
| 7,922,037 | B2 * | 4/2011 | Ohmura et al. | 221/123 |
| 7,937,829 | B2 * | 5/2011 | Petersen et al. | 29/832 |
| 2002/0121529 | A1 * | 9/2002 | Hoummady | 222/113 |
| 2003/0007421 | A1 | 1/2003 | Niemiec et al. | |
| 2005/0063102 | A1 | 3/2005 | Simon et al. | |
| 2008/0054007 | A1 * | 3/2008 | Mador | 221/1 |

FOREIGN PATENT DOCUMENTS

| | | |
|---|---|---|
| GB | 2344194 | 5/2000 |
| WO | WO 03/092576 A2 | 11/2003 |
| WO | WO 2008004212 | 1/2008 |

* cited by examiner

MEDICATION DISPENSING SYSTEM AND METHOD

BACKGROUND OF THE INVENTION

It is generally recognized in the medical field that medication is most efficient when taken at prescribed time periods. However, patients who are prescribed medication do not always take the medication at the prescribed times. This can be caused by several factors, such as confusion or forgetting, and is especially frequent in cases where patients are prescribed two or more different medications to be taken at different times of day.

Many devices and methods have been proposed in the past to help remind patients to take their medication at specific times. Although satisfactory to a certain degree, there remained room for improvement.

SUMMARY OF THE INVENTION

This specification describes a medication dispensing system and method where the patient can have his personal console capable of receiving an insert having a tray with an array of medication compartments corresponding to respective times and dates at which the medication is prescribed to be taken. Membranes which can be hand-removed by the patient cover the respective compartments. The compartments can be filled and covered by a third party, such as a pharmacist, and the pharmacist can then set the specified times and dates at which the medication is to be taken in a programmable database of the console. When the console determines the time to dispense medication in a given one of the compartments has been reached, a visual and/or audible indicator can be triggered. In one embodiment, a visual indicator provided under the insert, and associated with the respective compartment, is lit, to visually indicate to the patient which compartment he should manually open. A corresponding detector provided under the insert can detect across the tray whether or not the membrane has been removed. Upon detecting removal of the membrane, the medication is registered as being dispensed in a database of the console, and the date and time of dispensing can be stored. When medication from the last compartment has been dispensed, the insert can be disposed of and replaced by another insert for another given time period. The data concerning the registered date and time of dispensing, which is indicative of whether the patient has taken the medication at the prescribed times or not, can be downloaded.

In realizing the medication system and method disclosed herein, one challenge lied in conceiving a system which could accommodate removable and/or disposable tray inserts. Some known systems have permanent compartments, and the opening or closing of the compartment door can be detected by a mechanical switch. Such permanent compartments had a sanitary drawback. Using removable and/or disposable tray inserts can help having always a clean tray filled with the fresh medication. However, to be profitable, disposable tray inserts should have a sufficiently low cost. In this view, membranes were found more suitable as a closure for the compartments of the disposable insert than rigid doors, because membranes could be manufactured as sheets and adhered to the tray after filling with medication. Still with a view of low cost inserts in mind, compartment opening detection equipment should be made part of the console rather than part of the insert when possible. This resulted in incorporating detectors in the console below the tray, and led to the challenge of devising detectors and an overall system configuration which allowed detection of the removal of the membrane from below, across the tray. These and other challenges were addressed, as will be understood by persons skilled in the art in the light of this specification.

In accordance with one aspect, there is provided a method for dispensing medication, the method comprising: placing said medication in a receptacle; covering said receptacle with a membrane; detecting an absence of said membrane over said receptacle when said membrane is removed and said medication is accessed, said detecting comprising emitting a signal beneath said membrane in a direction of said membrane, identifying said membrane as present when said signal is transmitted back by said membrane, and identifying said membrane as absent when said signal is not transmitted back by said membrane; and registering said medication as being dispensed when said absence has been detected.

In accordance with another aspect, there is provided a medication dispensing system comprising a console having a receiving area configured and adapted for receiving an insert in a given position therein, the insert having a tray with an array of medication compartments and a plurality of hand-removable membranes each covering a respective one of the medication compartments, the console further comprising a plurality of membrane detectors, each detector associated with a corresponding medication compartment of the tray, each detector comprising both an emitter and a corresponding receiver, configured and adapted for transmitting a signal emitted by the emitter to the receiver via a corresponding one of the membranes when the insert is positioned in the receiving area, the console detecting that a given one of the membranes has been removed when the corresponding signal is not received by the corresponding receiver.

In accordance with another aspect, there is provided a tray insert having an array of medication compartments, for use with a medication dispensing console having a corresponding array of detectors and lights, the insert comprising a plurality of hand-removable membranes each covering a respective one of the medication compartments and each having at least a detection area, and a respective light transmission area associated with each medication compartment, the tray insert being configured and adapted for being removably nested within said console with each membrane having its detection area aligned with a corresponding one of the detectors, to allow detection of the removal of the membrane by the corresponding detector, and each one of the light transmission areas being aligned with a corresponding one of the lights, to allow visual indication of the corresponding membrane compartment.

DESCRIPTION OF THE FIGURES

In the figures.

DETAILED DESCRIPTION

Figure 1:
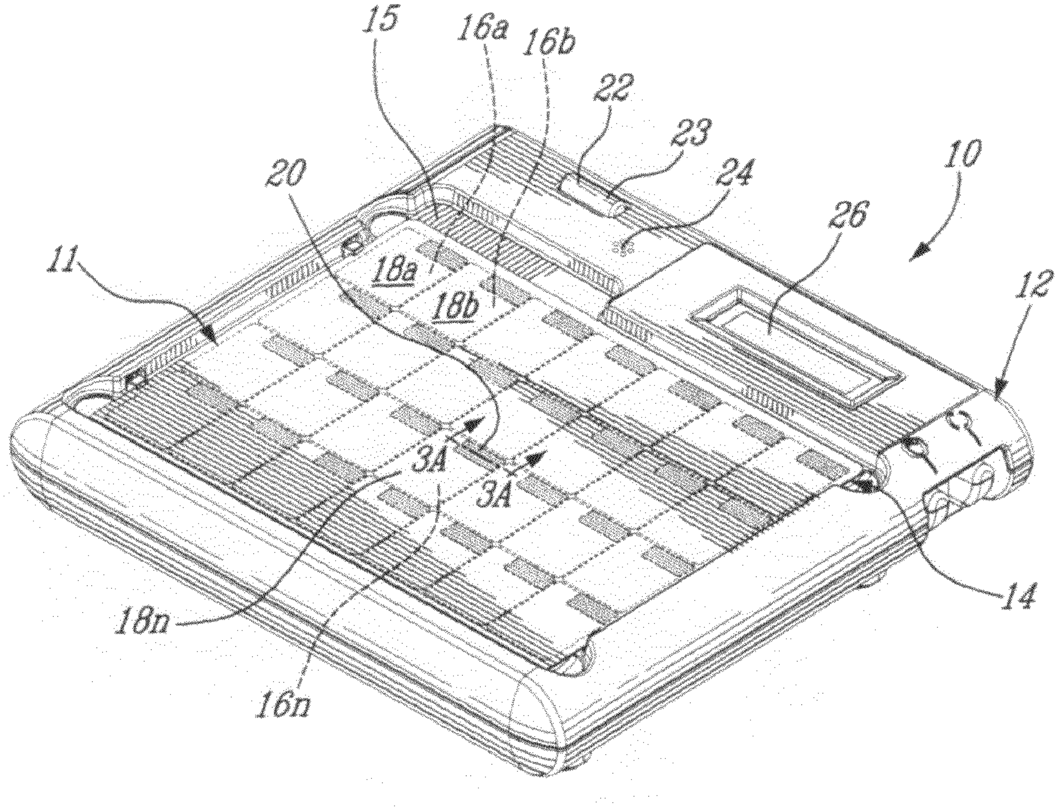
FIG. 1 is a perspective view of an example of a system for dispensing medication.

FIG. 1 shows an example of a medication dispensing system 10. The system 10 has a console 12 with a receiving area

11 configured and adapted for receiving an insert 14 (shown received in the console 12). The insert 14 has tray 15 with an array of medication compartments 16*a*, 16*b*, 16*n*, each covered by a corresponding membrane 18*a*, 18*b*, 18*n*. The membranes 18*a*, 18*b*, 18*n* are designed to be hand-removable by the patient. Each one of the membranes 18*n* has a detection area 20 designed to make the presence and/or absence of the membrane 18*n* detectable by a detector (not shown) provided in the console 12, below the insert 14 when the insert 14 is received in the console 12. In this example, the console 12 also has a database (not shown) in which time periods at which the different compartments 16*a*, 16*b*, 16*n* should be dispensed can be stored, a real time clock (not shown), a display 26, and a visual alarm 22 and/or an audible alarm 24, to indicate when one of the stored time periods has been reached. The visual alarm 22 is provided below a window 23 in this example. The console also has a plurality of visual indicators (not shown), each associated with a corresponding compartment 16*a*, 16*b*, 16*n*, to visually indicate to the patient which specific one of the compartments 16*a*, 16*b*, 16*n* he should access. The insert 14 can be sold separately from the console 12.

Figure 2:
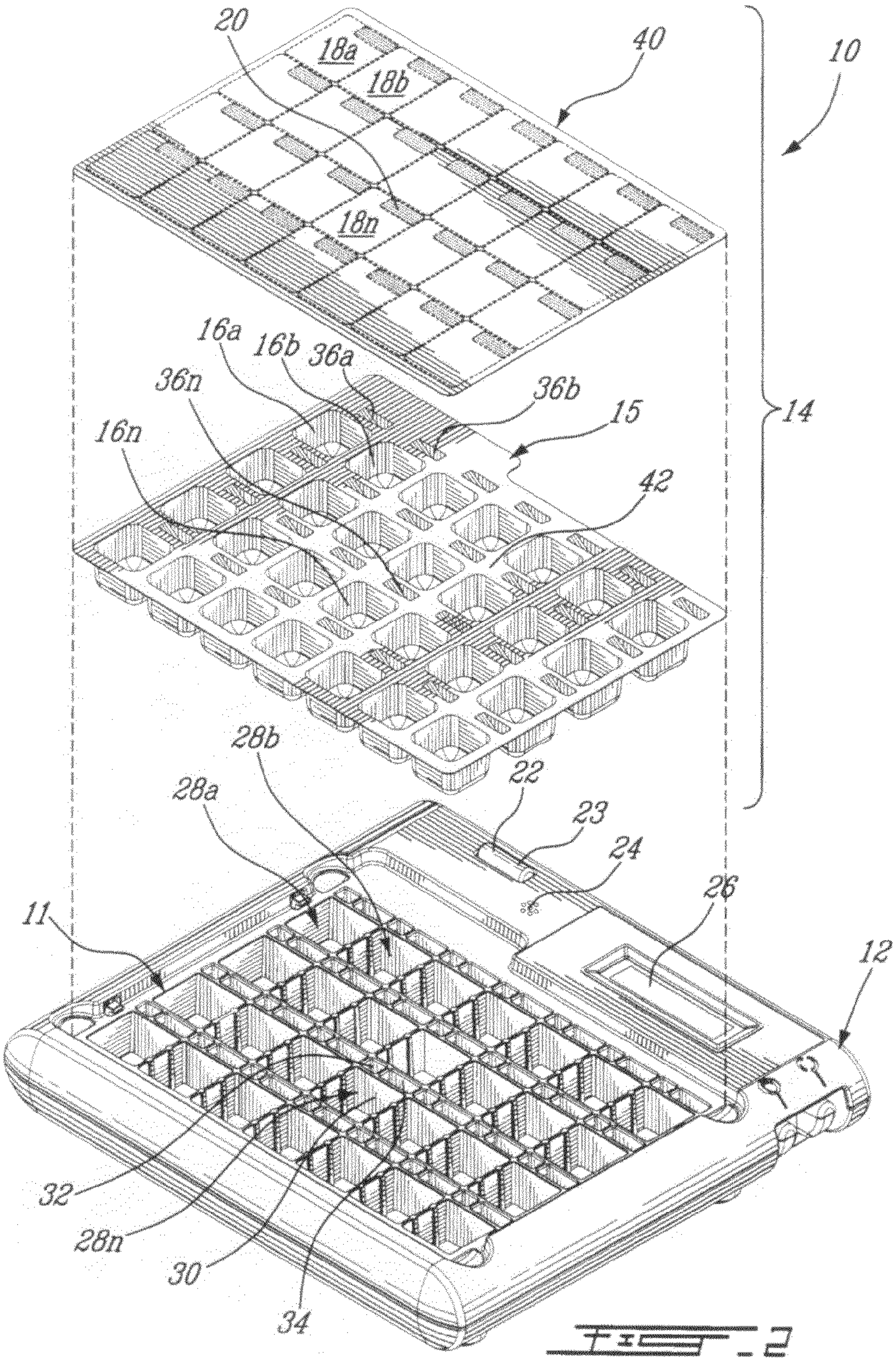
FIG. 2 is an exploded view of the system of FIG. 1.

In FIG. 2, the receiving area 11 of the console 12 can be seen to have a plurality of medication compartment areas 28*a*, 28*b*, 28*n*. Each medication compartment area 28*n* has a main chamber 30 shaped and sized to receive a corresponding medication compartment 16*n* of the tray 15, a detector chamber 34 housing the respective detector, and an indicator chamber 32 housing the respective visual indicator. The detectors and indicators are connected on an electrical circuit board (not shown) provided below the chambers. The tray 15 has the medication compartments 16*a*, 16*b*, 16*n*, and further has a plurality of recesses 36*a*, 36*b*, 36*n*, each recess 36*n* being adapted to fit inside a corresponding detector chamber 34 in the console 12. In alternate embodiments, the specific configuration of the console 12 and insert 14 can depart from the one illustrated.

In this example, a pre-painted membrane sheet 40 having the plurality of membranes 18*a*, 18*b*, 18*n* corresponding to the medication compartments 16*a*, 16*b*, 16*n* pre-cut therein is used, and can be adhered as a whole to the surface 42 of the tray 15 after the tray 15 has been filled with the medication.

Figure 3A:
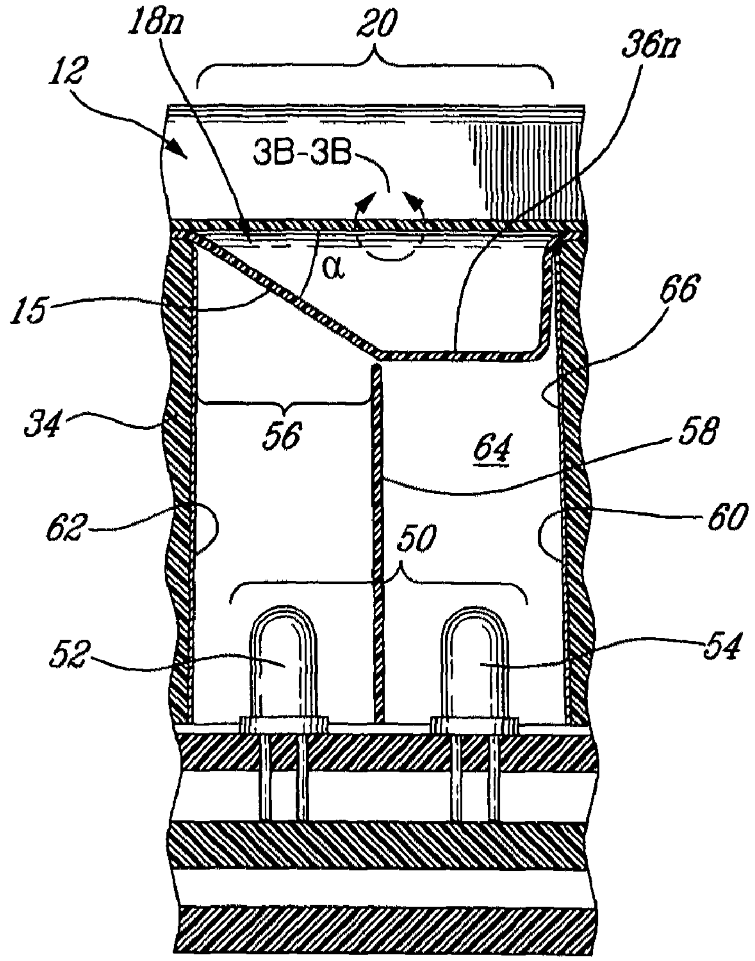
FIG. 3A is a cross-sectional view taken along cross-section lines 3A-3A of FIG. 1.
Figure 3B:
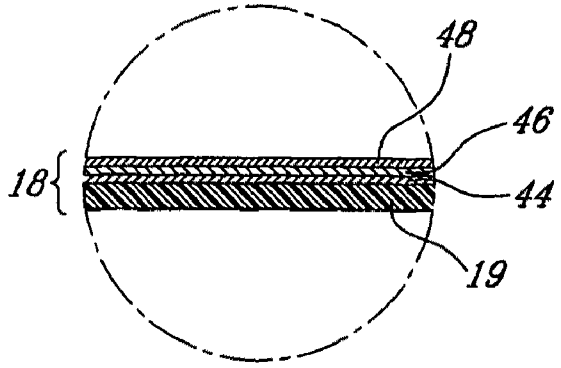
FIG. 3B is a portion of FIG. 3A shown enlarged.

The following details are given for the purpose of illustration only, referring to FIG. 3A, which shows a cross-sectional view taken through a detector area 34. In this example, the tray 15 can be made of 0.015" thick see-through plastic, and the membrane 18, shown enlarged at FIG. 3B, can have a 0.004" thick layer 19 of see-through polyester with a reflective coating 44, such as a light or metallic color paint for instance, and a shading coating 46, such as black or dark color paint for instance, above the reflective coating 44, in the detection area 20. Optionally, an additional layer 48 can be present, such as colored paint for aesthetic or protective reasons, for instance. The detector 50 can include an emitter 52 which transmits a signal through the tray 15 and transparent polyester layer 19 of the membrane, which is then reflected on the reflective layer 44 and is sent back through the tray 15 to a receiver 54. In this example, an infrared LED is used as the emitter 52 and an infrared phototransistor is used as the receiver 54, respectively model QED 123 plastic infrared LED and model QSD 123 plastic silicon infrared phototransistor, both manufactured by FAIRCHILD SEMICONDUCTOR®, to be precise. The emitted signal can be a square signal modulated at a suitable frequency, for example.

FIG. 3A also shows that the portion 56 of the tray 15 which is positioned above the emitter 52 is sloped at an angle α. The angle α can be selected to be approximately the Brewster angle, which represented about 32.5° in the instant example. This can help reduce the occurrence of parasite reflection by the tray 15 itself, and can help orienting remaining parasite reflection away from the receiver 54, so that the signal is not erroneously transmitted to the receiver 54 even when the membrane 18 is removed. Alternately, an aperture (not shown) can be provided in the tray to allow transmission of the signal to and from the membrane, for example. A separator 58 is provided between the emitter 52 and the receptor 54 to reduce the likelihood of direct transmission therebetween. To further help transmission of a clear signal, the walls 60, 62, 64 of the detector chamber 34 can be made infrared absorptive, such as by coating with a layer 66 of black paint, for example. The shading coating 46 (FIG. 3B) on the membrane 18 helps reduce transmission of ambient radiation to the receptor 54, to reduce its possible effect on the signal.

Figure 4A:
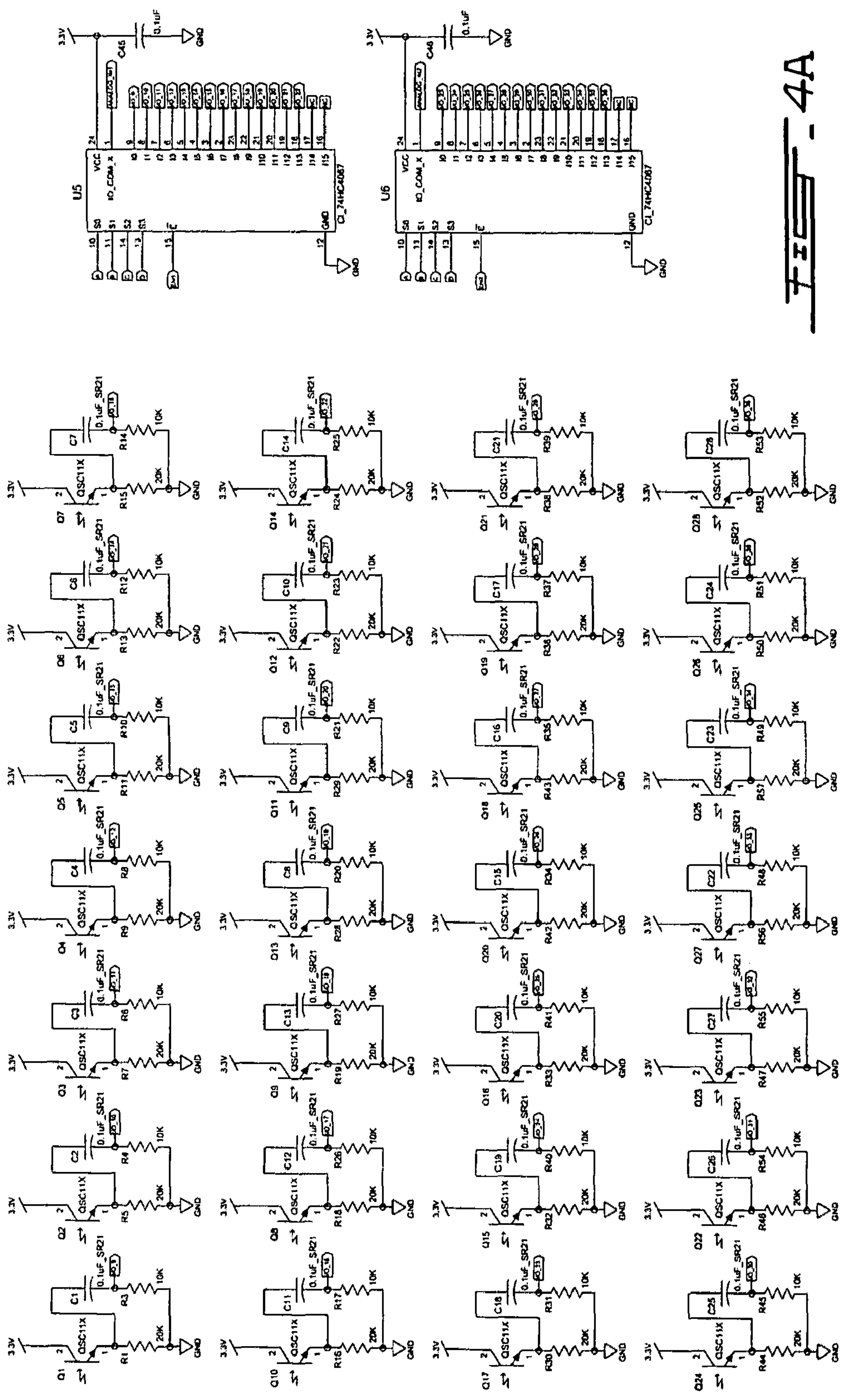
FIG. 4 includes FIGS. 4A, 4B, and 4C, and is a schematic of the electric circuit of the system of FIG. 1.
Figure 4B:
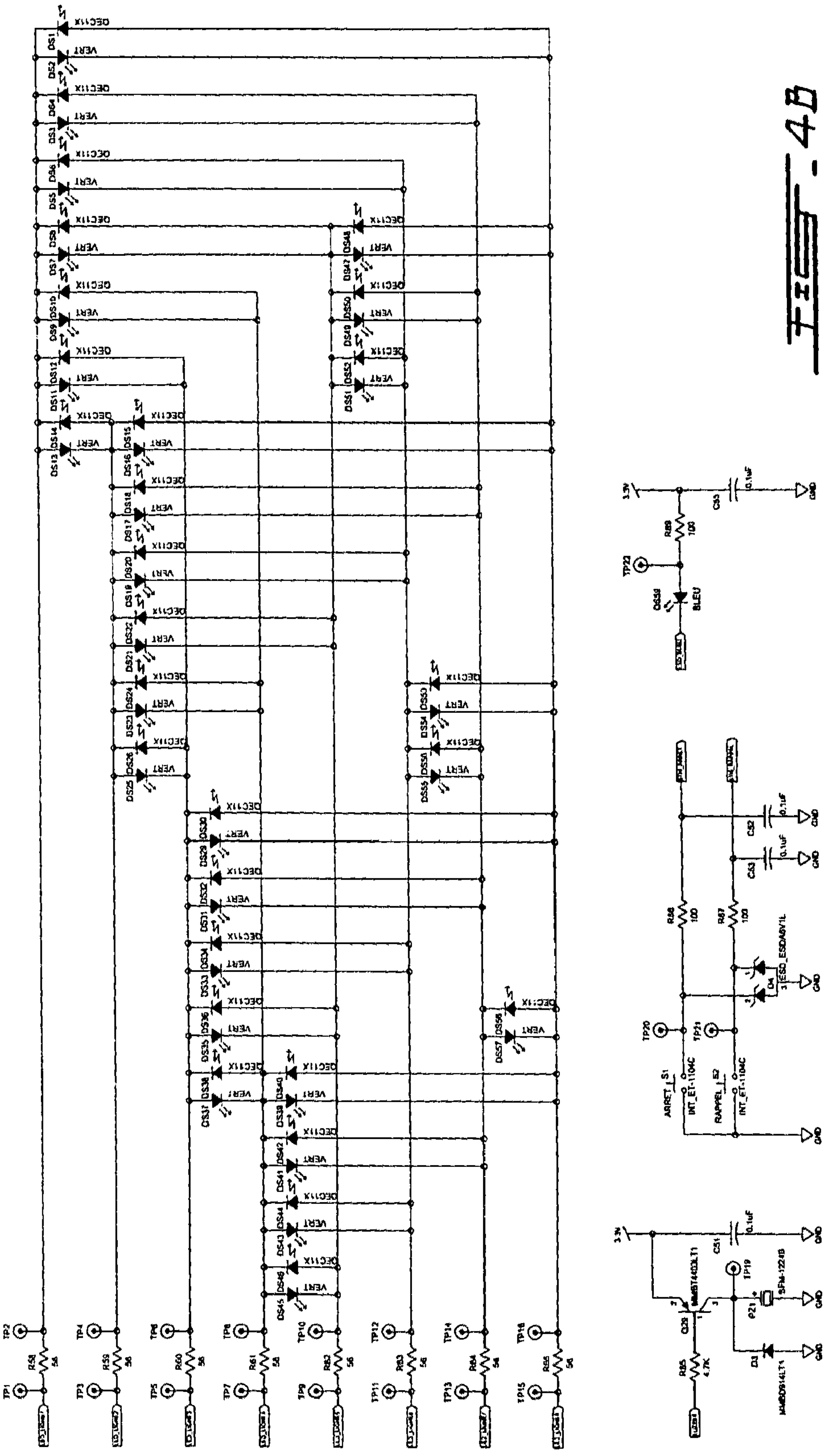
Figure 4C:
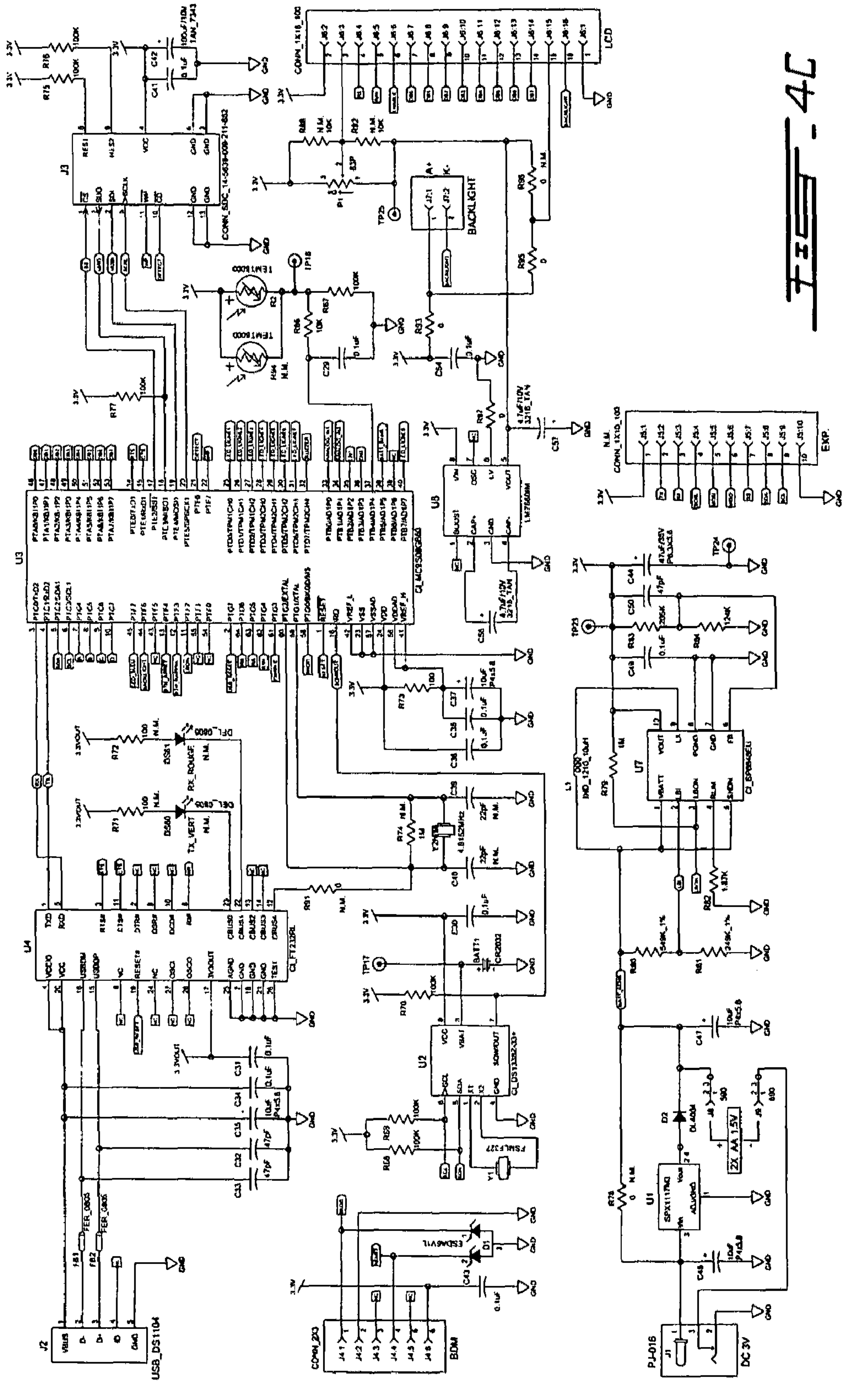
Figure 5:
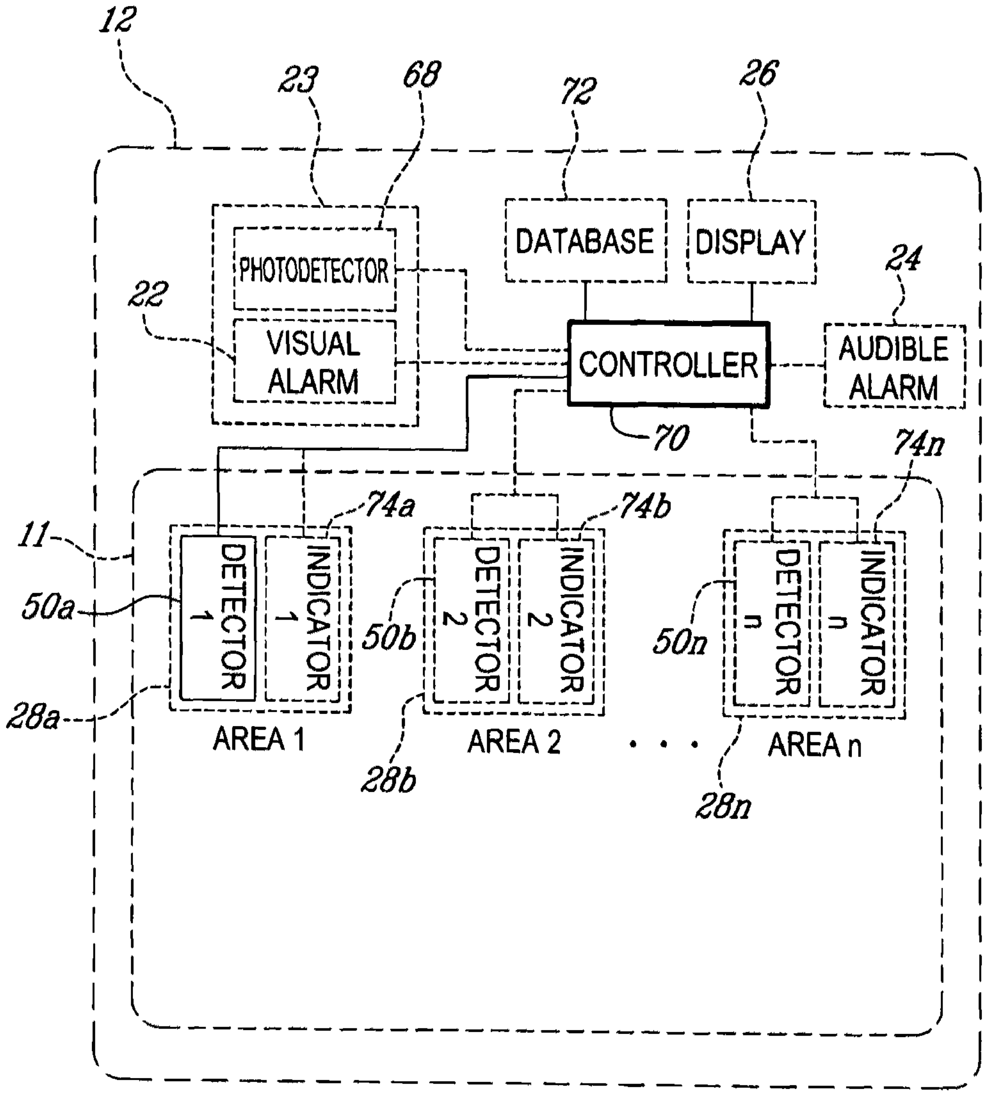
FIG. 5 is a bloc diagram of the system of FIG. 1.

FIG. 4 shows the electric circuit which is used in the system described above and illustrated, whereas. FIG. 5 shows a block diagram showing various components the system can have. It is seen that the console 12 can also include a pilot photodetector 68 which can be used as a reference by a controller 70 of the console 12 to obtain an indication of the ambient light or radiation in the console's immediate environment. The data from the pilot photodetector 68 can be used to help the controller 70 in interpreting variations or errors in the signals received by the detectors 50*a*, 50*b*, 50*n*.

Referring to FIGS. 1 and 5, in use, the tray 15 is filled with medication and the compartments 16*a*, 16*b*, 16*n* are covered by respective hand-removable membranes 18*a*, 18*b*, 18*n*. Each compartment thus acts as a receptacle for the medication. A database 72 of the console 12 is loaded with data concerning the time and date periods at which respective compartments 16*a*, 16*b*, 16*n* are to be dispensed to the patient. The insert 14 is placed in the receiving area 11 of the console 12. When the controller 70 detects that one of the predetermined time periods is reached, an audible 24 and/or visual alarm 22 is activated. Different alarms can be used for different compartments, if desired, and the different alarms can be programmed to remain active for any desired amount of time. Further, the controller 70 can activate the specific visual indicator 74*n* corresponding to the specific compartment 16*n* to be dispensed.

The controller 70 can periodically scan the detectors 50*a*, 50*b*, 50*n* to determine the status of the membranes 18*a*, 18*b*, 18*n*, i.e., if they are open or closed. When the specific compartment 16*n* to be dispensed is determined to be open, or the predetermined time period is passed, the visual alarm 22 and audible alarm 24 are stopped, and the information can be recorded in the database 72. The controller 70 can be programmed to sound an alarm if the wrong membrane is detected as being removed, or if a membrane is removed at the wrong time. Further, the controller 70 can be programmed to automatically detect when the insert 14 has been removed and changed by another insert by detecting that one or more of the membranes which were previously registered as being removed subsequently appear to be present.

Figure 6:
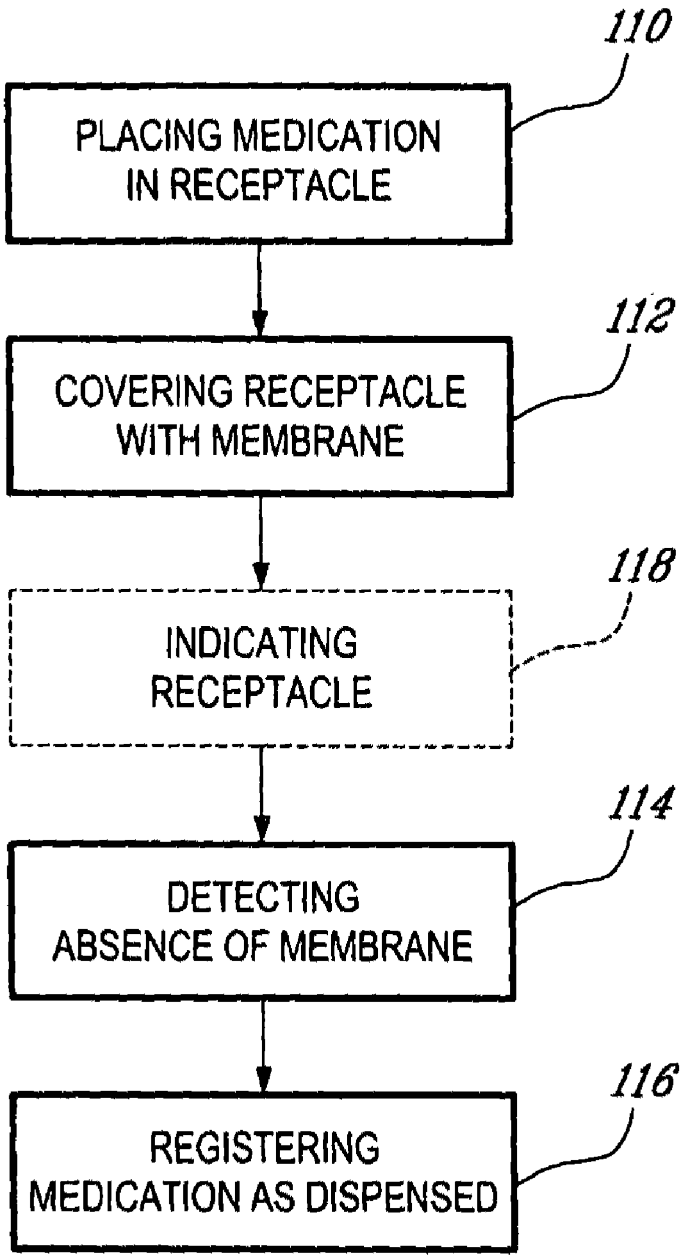
FIG. 6 is a flow chart of a method of dispensing medication.

FIG. 6 shows a flow chart of steps of an example of a method of dispensing medication. The medication is placed 110 in a receptacle or compartment, the receptacle is covered 112 by a membrane, the absence, or removal, of the membrane is detected 114, and the medication is registered 116 as dispensed. Optionally, the system can indicate 118 which compartment is to be opened by the patient when the controller detects that the time to dispense the medication from one compartment is reached, upon accessing the database. In one embodiment, registering the medication as dispensed can include storing the time and date at which the medication was dispensed in the database. The database can include one or more components to store different data, for example.

The example given above was provided for illustrative purposes. In other embodiments, different detectors and/or system configurations than the ones described above can be used. For example, instead of using a detector which has an emitter and receptor in combination with a membrane having reflective detection area, a detector which has a photodetector can be used in combination with a membrane having a shaded detection area to detect removal of the membrane upon the increase in the photodetector output which follows the removal of the obstructing shaded area, for example. In another embodiment, the detector can have a capacitive emitter which transmits an electric signal to an electrically conductive portion of the membrane, and a capacitive receiver which receives the electric signal from the electrically conductive portion of the membrane. Other detectors can be used as well.

It can be useful that in the insert, there be provided a plurality of transmission areas associated with corresponding compartments, to be aligned with the corresponding visual indicators when the insert is in the given position in the receiving area of the console, to allow light from the visual indicators to be transmitted across the insert, to the patient. In the embodiment described above, the transmission area is provided as a portion of the membrane, adjacent the detection area, without a shading layer of paint. In alternate embodiments, the transmission area can be adjacent to the membrane, for example.

The display can be used to transmit information to the user, such as the user's name and/or a time period for the insert, for example, to confirm to the user that the information programmed into the database effectively corresponds to the specific insert which has been positioned in the console. The display can also be associated with an alarm. The console can additionally include an interface, such as a button for recalling the visual indication of the medication compartment corresponding to the last alarm which was sound and a button to cancel an alarm, for example.

In the example described above and illustrated, the receiving area of the console has three chambers corresponding to each medication compartment of the insert. The exact configuration of alternate embodiments can depart from this example. For example, it can be suitable to position the visual indicator directly below the medication chamber in alternate embodiments, or to use a detector which additionally acts as a visual indicator such as by using a color LED instead of an infrared LED, for example.

As can be seen therefore, the examples described above and illustrated are intended to be exemplary only. The scope is indicated by the appended claims.

What is claimed is:

1. A medication dispensing system comprising a console having a receiving area configured and adapted for receiving an insert in a given position therein, the insert having a tray with an array of medication compartments and a plurality of hand-removable membranes each covering a respective one of the medication compartments, the console further comprising a plurality of membrane detectors, each detector associated with a corresponding medication compartment of the tray connected to the console via a contactless signal connection, each detector comprising both an emitter and a corresponding receiver, configured and adapted for transmitting a signal emitted by the emitter to the receiver via a corresponding one of the membranes when the insert is positioned in the receiving area, the console detecting that a given one of the membranes has been removed when the corresponding signal is not received by the corresponding receiver, wherein each one of the hand-removable membranes has a reflecting area, and wherein the emitters are light emitters and the receivers are light receivers, configured and adapted for transmitting said signal to the reflecting area of the corresponding membrane across the tray, and the reflecting area reflecting the signal back across the tray to the receiver when the insert is positioned in the receiving area, the signal not being transmitted to the receiver when the corresponding membrane has been removed.

2. The medication dispensing system of claim 1 wherein each one of the hand-removable membranes further has a shading layer covering the reflecting area.

3. The medication dispensing system of claim 1 wherein the tray has a plurality of recesses positioned above corresponding detectors when the insert is positioned in the receiving area, each recess comprising a sloping portion configured and adapted for orienting parasite reflections away from the receiver.

4. The medication dispensing system of claim 1 wherein the tray has a plurality of recesses positioned above corresponding detectors when the insert is positioned in the receiving area, each recess comprising a sloping portion at an angle approximately equal to the Brewster angle for the emitted signal.

* * * * *